United States Patent Office 3,317,174
Patented May 2, 1967

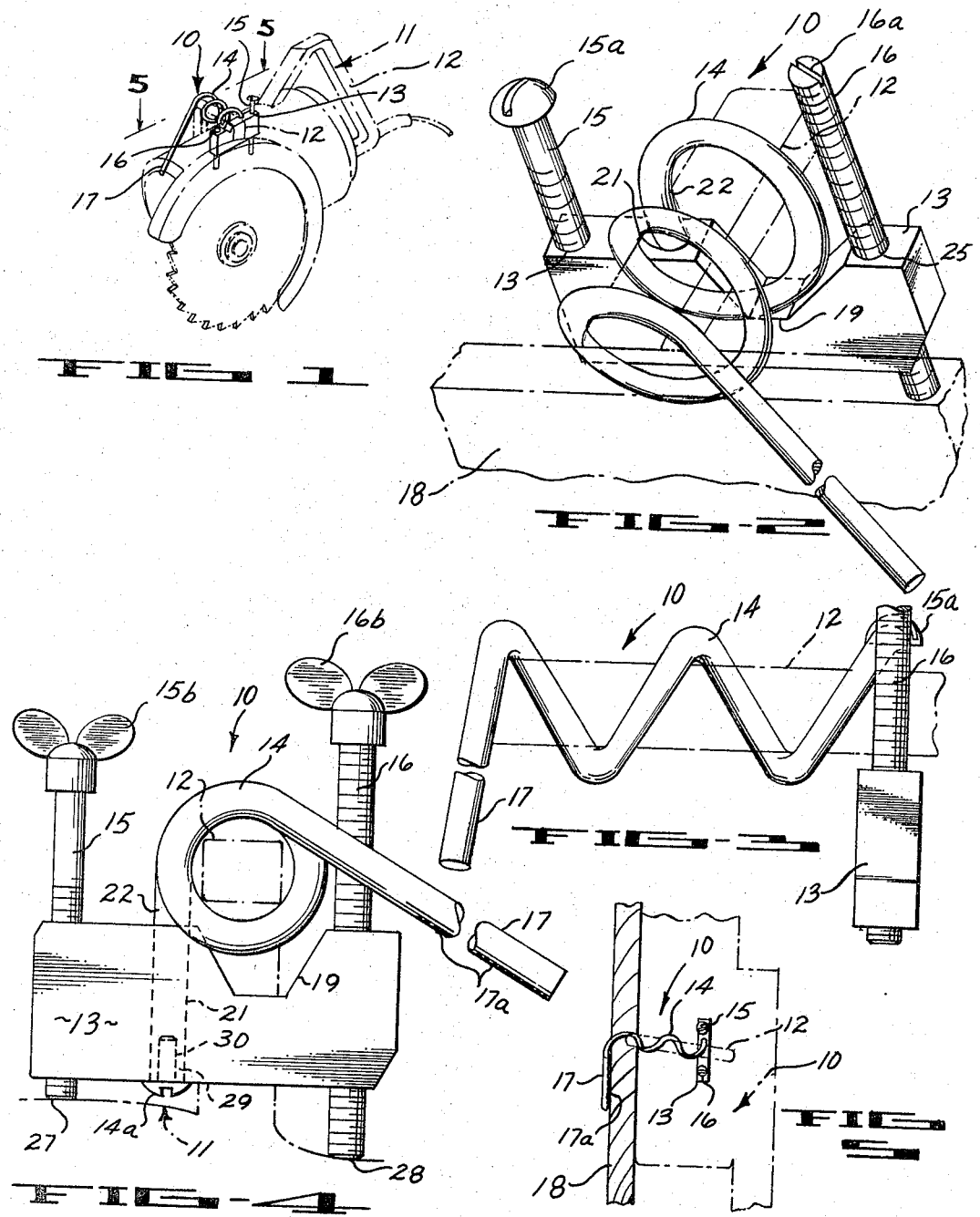

3,317,174
PORTABLE ELECTRIC SAW HANGER
Wilborn F. Wilkerson, Jr., 4247 Yaleton Ave.,
Covina, Calif. 91722
Filed Oct. 4, 1965, Ser. No. 492,490
6 Claims. (Cl. 248—359)

The present invention relates generally to hanging accessories; more particularly, the invention relates to novel means for hanging or supporting portable electric saws or other tools on rafters and the like.

The present invention contemplates devices for attachment to the handle of portable electric hand saws or other tools for hanging or supporting the saw or tools on building structural members, such as rafters or ceiling joists near a work area, on a job.

In using electric hand saws in building construction work, it is often necessary or convenient for the carpenter or saw opeartor to lay the saw aside. In so doing, it has been a common practice to position the saw with one portion thereof on one structural member such as a rafter, and another portion of the saw on a second member—that is, the saw is supported across two parallel members or two closely spaced members. This can involve the precarious or hazardous positioning of the saw and for safety, requires time and care in placement. There is considerable hazard especially when the saw is positioned relatively high in a structure, such as on an upper floor or on the roof thereof. Falling saws create hazards of serious injury to persons and cause damage to or destruction of relatively expensive saw equipment.

In a prior art device which provides for hanging the saw, there is an arm, a fixed part thereof, extending forwardly of the saw handle in such a manner that the arm and the saw body engage a structural member, such as a joist or beam in the structure being worked on.

With a device of this nature, it is necessary to design and fabricate an individual type of arm for each different form of portable electric hand saw. That is, when a new type of saw appears on the market, a particular "hanging" arm must be designed and manufactured for it, or made part of it.

In other prior art hangers for electric saws, the hanger component is formed integrally with the handle and cannot be readily removed when not needed as when working at ground level, on a work table or at saw horses, and easily replaced when it is needed on a construction project.

It is therefore an object of the present invention to provide a novel hanger attachment for a variety of different types of portable electric saws, or other tools.

An object of the invention is the provision of a hanger attachment for portable electric saws or other tools which is easily attached to and removed from the saw or other tools.

An object of this invention is to provide an easily attached and removed means by which a portable electric tool may be hung upon any convenient part of a building frame in a structure under construction.

It is an object of this invention to provide a portable electric tool hanging means wherein a lock block with a drill handle receiving recess therein has extending perpendicularly from the recess a resilient spiral, the spiral being anchored in one end of the lock block and being wrappable about the handle of the tool with an end extension which permits hanging of the tool on rafters or joists.

Another object of the present invention is to provide a helical coil device extending from a lock block adapted to receive the handle of a portable tool, the coil being wrappable about the handle and having an extension permitting the hooking of the coil and extension over a structural member securely to hang the portable tool when not in use.

Other objects, features and advantages of the present invention will become apparent to those versed in the art from a consideration of the following description, the appended claims and the accompanying drawings, wherein:

FIGURE 1 is a perspective view of the invention in use on saw handle, and showing the hanging of the saw on a structural member;

FIGURE 2 is an enlarged perspective view of a hanging device according to the invention;

FIGURE 3 is a side elevational view of the inventive article shown in FIGURE 2;

FIGURE 4 is an end elevational view of the inventive article shown in FIGURE 2;

FIGURE 5 is a sectional view taken at line 5—5 in FIGURE 1, illustrating details of the manner in which the invention clamps against a structural member to safety and securely hold the saw hanging therefrom.

Referring to the drawing, a hinger 10 according to the invention is shown in FIGURE 1 on a conventional electric hand saw. As shown in FIGURES 1 and 2, the hanger 10 includes a lock block 13 and a resilient helical coil member 14. Coil 14 is wrapped about a handle 12 of the saw, and lock block 13 is clamped to the handle by means of setting screws 15 and 16. A straight extension 17 of coil 14 hangs over a structural member 18 thus supporting saw 11 to hang on the structural member 18. The material of which the coil 14 is fabricated may be any suitable strong metallic or plastic substance of appropriate rigidity, strength and resilience for the weight of saws 11.

In the enlarged detail of FIGURE 2 the coil 14 can be seen to be wrapped about the fragment of handle 12 of tool 11 shown therein. Coil 14 has a short straight end 22 constituting one end and a longer straight extension 17 forming the other end. The lock block 13 has a generally rectilinear configuration and includes a notch 19 in the top surface thereof shown as trapezoidal, but which may have any convenient shape to receive a tool handle such as that shown at 12. The location of notch 19 is nearer one end of block 13 than the other. On the edge of notch 19 which is farthest from an end a bore 21 is provided to receive the short end 22 of coil 14.

At either end of block 13 are threaded bores 23, 25 to receive locking screws 15, 16. These screws may be of the round head type (15a) or slotted headless type (16a) or, as may be seen in FIGURE 4, of the thumb screw type with wings (15b, 16b) for easy tightening thereof in block 13. The choice is determined by how close to other objects the screw 15 or 16 will be placed. When a tool handle 12 is in notch 19, as may be seen in FIGURE 4, the ends 27, 28 of screws 15, 16 may be tightened against the body of the tool 11 applying pressure on block 13 against the resilient urge of helical coil 14 wrapped about handle 12, securely holding coil 14, block 13 and handle 12 together.

As may be seen in FIGURE 4 the extreme end 29 of straight short end 22 of coil 14 may be drilled and threaded as shown at 30 to receive a screw 31 to hold the end 29 of coil 14 in bore 21. Ordinarily, however, this may not be necessary since when end 29 of straight short portion 22 of coil 14 is inserted in bore 21 frictional forces due to the pressing of screws 15, 16 against tool 11 (as in FIGURE 4) will strain end 22 against the walls of bore 21 to securely hold the end 22 therein. Furthermore in clamping tool handle 12 in notch 19, coil 14 wrapped around handle 12 will be so positioned that end 22 inserted in bore 21 cannot be pulled out.

The detail shown in FIGURE 5 clearly illustrates how the extension 17 of coil 14 presses against the structural member 18 (shown in cross section). In both FIGURES 4 and 5, the extension 17 of coil 14 is shown to have serrations 17a on the inner surface thereof to add frictional forces to the gripping action of extension 17 on a structural member such as 18 when tool 11 is hung thereover.

It may thus be seen that this invention provides a novel helical coil member 14 having a short straight end 22 at one terminus thereof and a long straight extension 17 at the other terminus thereof, the short end 22 being engaged in a bore 21 in a lock block 13, the rest of the coil 14 being free and the extension 17 thereof being free. Lock block 13 has threaded bores on opposite ends parallel with the bore 21 to receive clamping screws 15, 16 and a notch 19 in the top surface thereof to receive a tool handle.

When helical coil 14 is wrapped about a tool handle 12 and end 22 thereof inserted in bore 21, the handle 12 fits into notch 19 of lock block 13. Block 13 and coil 14 can be moved laterally along handle 12 to provide a narrower or wider space between the tool body 11 and extension 17 for hanging over narrower or wider structural member 18. When screws 15 and 16 are tightened down against the body of tool 11, notch 19 tightly engages handle 12 and forces it to press against the resilient urge of helical coil 14. The angle of extension 17 with respect to the axis of coil 14 is such that it overhangs the end of tool 11. Thus, when extension 17 is positioned over a structural member such as 18 it forms a secure and effective hanger for the tool. Thus the tool may be safely hung while not in use on any convenient structural member, particularly where the work is being done above ground.

Those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A hanger for a portable tool having a handle, said hanger comprising: resilient means adapted to be wrapped about the handles of portable tools, and having a short straight end and a long straight end; and a locking means having a notch therein to receive the handle of a portable tool, a bore to receive said short straight end of said resilient means and having adjustment screws therein adapted to press against the tool and lock said handle in said notch, the long straight end of said resilient means adapted to extend from the side of said handle to provide a hanger for the tool which may securely support the tool when hung over a structural member.

2. A hanger for portable tools having handles thereon, said hanger comprising: a helical coil having a short straight end on one terminus thereof and a long straight extension from the other terminus thereof, said coil being adapted to be wrapped about a handle of a portable tool; a block of rectilinear configuration having a notch in the top surface thereof adapted to receive the handle of a portable tool; a first bore in said top surface of said block adjacent said notch, and adapted to receive said short straight end of said helical coil after said coil has been wrapped about said tool handle; second and third bores through said block and at opposite ends thereof, said latter bores being threaded to receive adjustment screws; and adjustment screws in said second and third bores, said adjustment screws extending through said blade so as to come in contact with the body of said portable tool when the handle thereof is engaged in said notch in said block, whereby said adjustment screws may be tightened against said body to press said handle into said notch, the long extension of said helical coil extending over the outside of said tool so that a hanger is formed for said tool by which it may be securely and safely hung from a structural member.

3. A hanger according to claim 2, wherein said long straight extension of said helical coil includes serrations on an inward facing surface thereof so as to provide improved frictional engagement of said extension with structural members over which said tool is to be hung.

4. A hanger according to claim 2, wherein said adjustment screws include at least one headless slotted screw to permit setting said tool close to said structural member over which it is to be hung.

5. A hanger according to claim 2, wherein said adjustment screws include at least one thumb screw having wings to permit easy tightening thereof.

6. An attachment for the handle of a portable hand tool to permit hanging of such tools from structural members, said attachment comprising: a helical member wrappable about the handle of a hand tool, said helical member including an outwardly extending arm portion at one end thereof and a straight end projection on the other end thereof; and a locking member including means for receiving said straight end projection of said helical member, notch means for receiving the handle of said hand tool and tightening means for securing said locking member to said handle, whereby said outwardly extending arm portion may be hung over a structural member, said tool depending therefrom, thereby providing a safe and secure hanger for said tool when not in use.

References Cited by the Examiner

UNITED STATES PATENTS 732,582 6/1903 McKay _____ 248—359 X
2,203,276 6/1940 Davis _____ 248—359 X CHANCELLOR E. HARRIS, *Primary Examiner.*